(12) United States Patent
Cramer et al.

(10) Patent No.: US 6,401,742 B1
(45) Date of Patent: Jun. 11, 2002

(54) MOISTURE SENSOR AND IRRIGATION CONTROL SYSTEM

(76) Inventors: Dean L. Cramer; Flora Chavez-Cramer, both of 609 Noble Pl., NE., Albuquerque, NM (US) 87107

( * ) Notice: Subject to any disclaimer, the term of this patent is extended or adjusted under 35 U.S.C. 154(b) by 0 days.

(21) Appl. No.: 09/435,849

(22) Filed: Nov. 8, 1999

(51) Int. Cl.[7] ............................................... A01G 25/16
(52) U.S. Cl. ..................... 137/78.3; 239/63; 324/664; 324/690
(58) Field of Search ...................... 137/78.3; 239/63; 324/664, 690

(56) References Cited

U.S. PATENT DOCUMENTS

| | | | | |
|---|---|---|---|---|
| 4,850,386 A | * | 7/1989 | Bireley | 137/78.3 |
| 4,929,885 A | * | 5/1990 | Dishman | 324/664 |
| 4,941,501 A | * | 7/1990 | Bireley | 137/78.3 |
| 4,952,868 A | * | 8/1990 | Scherer, III | 324/664 |
| 5,337,957 A | * | 8/1994 | Olson | 239/63 |
| 5,442,293 A | * | 8/1995 | Lange | 324/332 |

* cited by examiner

Primary Examiner—A. Michael Chambers (57) ABSTRACT

Disclosed is an electronic control assemblage for improving the watering habits to each zone in an irrigated parcel of land. The system consists of a 24 VAC transformer, a control unit, a sprinkler valve, and a probe assemblage for sensing the moisture level in a zone being watered. The electronic control unit is pre-modified to disable power to the sprinkler valve when the moisture level in the zone exceeds a prearranged level as measured by the moisture probe, buried in the zone area. In a preferred embodiment, the probe consists of a cylindrical stainless steel hollow metal shaft, a high purity dissembler metal point, separated with a dielectric material. The shaft, dielectric spacer, and point all have a predetermined length, wall thickness, and grade of material, pre-established to maximize the moisture detection characteristics of the probe. The control unit applies an electrical current along the shaft, energizing the dissembler metal point. The control unit records the soil impedance to determine the moisture content in the soil.

27 Claims, 6 Drawing Sheets

FIG. 1

FIG. 2
Actual Size

MOISTURE SENSOR AND IRRIGATION CONTROL SYSTEM

BACKGROUND OF THIS INVENTION

1. Field of the Invention

The present invention relates to a 24VAC sprinkler irrigation control system. More specifically, the present invention details a portable moisture sensing probe that controls the irrigation system based upon the soil moisture content of a single zone or variation of zones in landscapes to be watered.

2. Description of Related Art

Communities throughout the United States and the world share an uneasy reliance on both surface and sub-surface water supplies. Water tables are dropping more rapidly than expected, and water conservation is of utmost concern to governing officials. As population growth increases, the demand for fresh potable water also increases in most arid states. State and local governments have issued mandates regarding the use of landscape irrigation water, and are promoting the conservation and use thereof Thus, farmers worry there won't be enough water to feed their crops. And environmentalists worry that too little water is allowed for natural purposes. Additionally, businesses worry that a lack of water will dampen the availability of jobs.

Landscape irrigation accounts for approximately 50% of the water used externally by homeowners and businesses. According to landscape architects, most homeowners with large landscapes apply twice as much water as their lawn actually needs. This results in an enormous waste of fresh potable water needed for internal uses. The competing interest for fresh water has driven costs to the point that some homeowners are considering xerscaping.

Unfortunately the major cause for over watering is the lack of irrigation information, and technology to control waste. Consequently, there are so few types of landscape irrigation controllers, other than timers. These timers do not know when it is raining, nor do they know over watering must stop. The complexity of a multi-station timer switches opening the sprinkler valves for a specific amount of time daily, are confusing and very labor consuming. The inefficiency is in the fact they deliver water based upon the time of day, regardless of the moisture levels in the soil. Timers which are expensive and inefficient wasters of water can be modified with optimal devices which measure and control the moisture level in the zones prior to watering. Moreover, it is not convenient for most rate payers to check the moisture levels in their lawns, and strictly have relied upon timers to do so.

Since moisture probes are extremely sensitive to placement and orientation within the soil itself. Generally, moisture probes react differently to different soils, and have a low probe life of one to two years. The performance is normally at a lessor level, resulting in either over or under watering. The majority of soil probes do not change alternating current (AC) to direct current (DC) in satisfy building and safety codes.

Therefore, there is a need for an irrigation control system that does not need a timer to control landscape irrigation. There is also a greater need for a system that can measure "real-time" moisture in the soil and yet, be suited to the both post and pre-market timered landscapes. This system will be extremely responsive to small amounts of moisture changes that occur in all soil types, in all types of weather conditions. In addition, this system will have multiple placement applications for those landscapes with extreme elevations, and soil slippage, should this occur.

SUMMARY OF THE INVENTION

The above requirements are satisfied by the present invention. In one aspect of the invention, there is disclosed a soil probe system configured to monitor the level of moisture in a watering zone location. The moisture sensor system includes a probe consisting of different metals, with different lengths, utilizing a "pencil like" shaft, separated by a dielectric material, all having a length, width, and circular thickness. The system further includes a transformed source of alternating electrical (VAC) power connected to the control unit. The control unit connects to the probes' tubular shaft and dissimilar metal point for applying a direct current (VDC) to the electrode through the control unit for measuring the electrical potential between the two dissimilar metals. The control unit is configured to disarm the flow of electrical power from the transformer or timer to an electronic valve, if the electrical impedance is below a predetermined value.

In another aspect of the invention, there is disclosed a method for controlling water distribution to soil, comprising the steps of placing a moisture sensor vertically in the soil at the grass root level. Another aspect of the invention, the probes can be moved to accommodate changes in soil structure and watering habits. And, in another aspect of the invention, utilizing dissimilar metals improves the life span of probe life considerably.

Moreover, another aspect of the invention discloses a unitized system for watering a series of zones. It is comprised of a transformer or timed power supply, (if necessary) for supplying power along the power path. A first soil probe is located along the power pathway. The soil probe system includes a first water valve connected to a first sprinkler, a first moisture probe configured to measure the moisture level in the first watering zone, and a first control unit communicating with the first moisture probe and the first water valve. The first control unit is configured to close the first water valve if the moisture level is below a predetermined level. A second soil probe system is located along the power path and includes a second water valve connected to a second sprinkler, a second moisture robe configured to measure the moisture level in a second watering zone, and a second control unit configured to close the second water valve if the moisture level in the second water zone is below the predetermined level. A relay is located in the power path between the power supply and the second soil probe system. The relay is controlled by the first control unit to allow power to flow across the relay when the moisture level in the first watering zone is greater or equal to the predetermined level, and to inhibit power from passing across the relay when the moisture level in the first watering zone is less than the predetermined level.

These and other features of the invention will now be described with reference to the drawings of the preferred embodiment of the moisture sensor and irrigation control system. The illustrations are intended to illustrate, but not to limit the invention.

BRIEF DESCRIPTION OF THIS INVENTION

DETAILED DESCRIPTION OF THE PREFERRED EMBODIMENT

Figure 1:
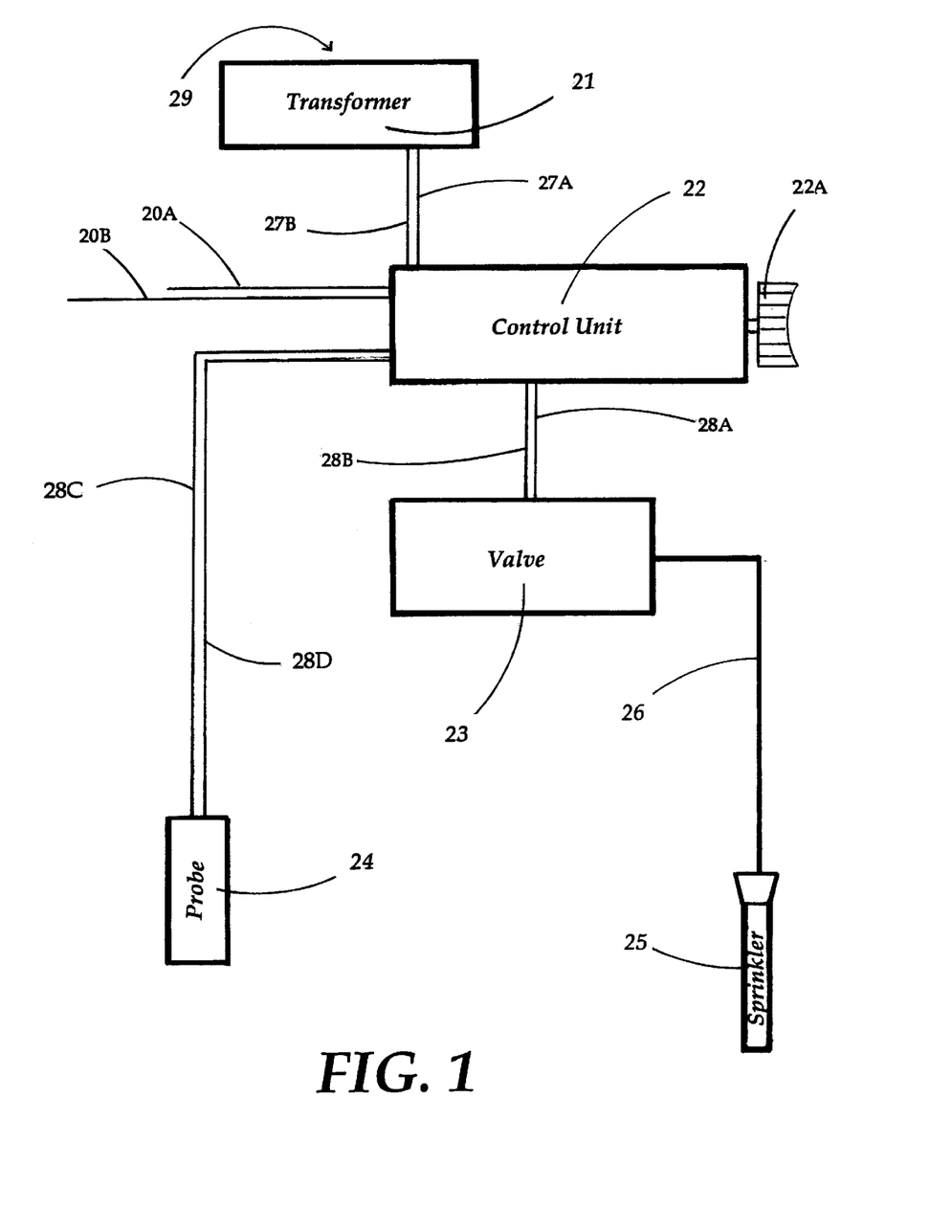
FIG. 1 schematically illustrates the mechanical and electrical components of the sprinkler system of the present invention.

FIG. 1 schematically illustrates an irrigation system 29 configured in accordance with a preferred embodiment of the present invention. One embodiment of the irrigation system 29 consists of a number of components, including a transformer 21, a control unit 22, at least one sprinkler valve 23 which is connected to a plurality of irrigation sprinkler heads 25, and a moisture sensor or probe 24 for detecting the level of moisture in a watering zone in accordance with the present invention. As used herein, the term "watering zone" refers to an area of plants that is to be watered using the irrigation system 29. In most watering zones, a wide variety of plant life may be located in the sprinkler patterns, such as, for example, lawn, trees, shrubbery or gardens. The watering zones may be located on a homeowner's yard, an industrial landscape, a park, on farms with larger acreage sprinkler systems, or any other area of land that is irrigated for a variety of purposes.

As discussed, the irrigation system 29 will include a (24VAC) transformer which is connected to a source of 110 VAC power outlet (not shown). A 24VAC transformer is used to reduce the voltage to a safety level described in most city building and safety plumbing codes. The transformer directs power to the system 29, for continuous energization of the irrigation system 29 at one hundred percent (100%) of the total irrigation time. Any standard 24VAC transformer may be used. A timer (not shown) may be used between the transformer 21, and the control unit 22, but need not be included in the irrigation system 29 of the present invention. The inclusion of a timer is only for the convenience of the owner needing a set watering time.

As illustrated in FIG. 1, the irrigation system 29 further includes a control unit 22 which is interposed along an electrical circuit between the transformer and the other components of the irrigation system 29. The control unit 22 controls and monitors a number of functions of the irrigation system 29, as described in detail below. Preferably, the control unit 22 is electrically connected to the transformer 21 so that the control unit 22 acts as a conduit to route electrical power to the rest of the components of the irrigation system 20. In a preferred embodiment, the control unit 22 must include a 24 VAC transformer 21 that converts the 110 24 VAC electrical current to a 24 VDC that is received by the moisture probe 24, and delivered back to the solenoid at the sprinkler valve 23. Depending on the power source, other suitable transformers could be used. The transformer 21 may be external to the control unit 22. The control unit 22 converts the incoming 24 VAC to 24VDC for internal use, applies a voltage for external use at the moisture probe 24, and control circuitry decides whether or not to pass the 24VAC to the sprinkler valve 23. The probe is an impedance circuit. Advantageously, the control unit 22 includes a converter (not shown) for converting the 24 VAC current into a 1.5 DC current that the control unit 22 supplies to the moisture probe 24, as described in detail below.

As shown in FIG. 1, the control unit 22 is electrically connected to an electronically-controlled sprinkler valve 25, which is connected to a source of pressurized water (not shown). The sprinkler valve 25 may be any type of electronically-controlled valve, but advantageously is one which opens in response to receiving an electrical current of a pre-determined voltage. Preferably, the valve 23 is a standard, electronically-controlled 24VAC anti-siphon solenoid valve being standard in the industry.

Referring to FIG. 1, the valve 23 is connected to, and controls, the supply of water to at least one water conduit 26, so that when the valve 23 opens in response to an electrical current water flows from the pressurized water source into the water conduit 26 for distribution to the watering zone. The water conduit 26 may be any type of device known to those skilled in the art for transporting the flow of water, such as, for example, plastic or metal pipe, hose, etc. The water conduit 26 may be disposed either above or below ground. Although the irrigation system 29 is illustrated in FIG. 1 as having a single valve 23 connected to water conduit 26, it will be appreciated that nay number of valves and water conduit combinations may be used with the present invention.

As shown in FIG. 1, the water conduit 26 routes a flow of water to an irrigation sprinkler head 25 for dispersing water over a predetermined watering zone. Preferably, the water conduit 26 connects to a plurality of irrigation sprinkler heads 25 which are distributed over the watering zone. The irrigation sprinkler heads 25 are advantageously arranged to uniformly disperse water over the entire watering zone, which may result in overlapping of the watering range of some of the irrigation heads 25. The present invention may use any wide variety of irrigation heads 25 for dispersing water over the parcel of land zoned for example, spray heads, drip delivery heads, a surface flooding head, or any combination thereof.

Figures 5, 6:
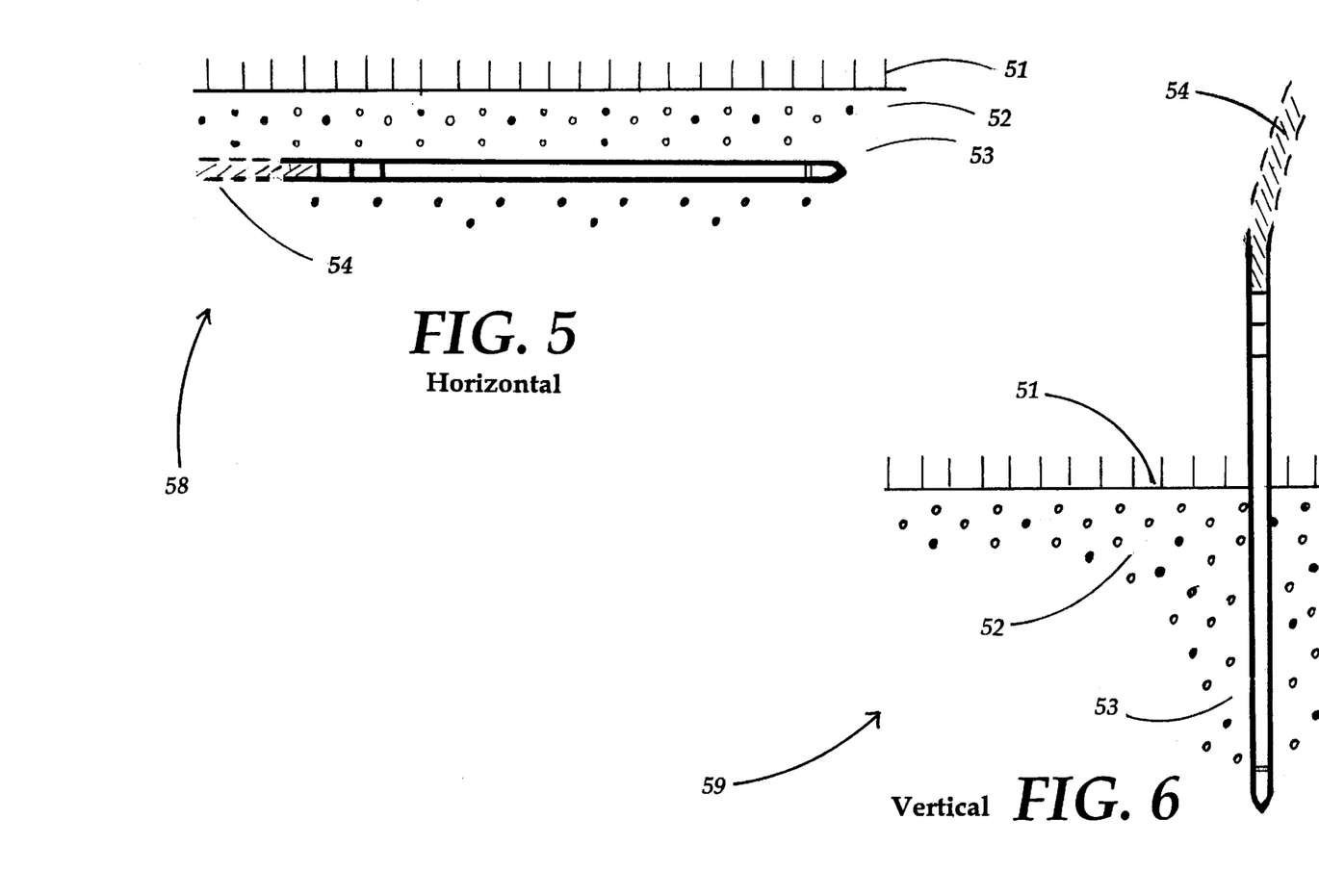
FIG. 5 is a side view of the moisture probe of FIG. 2 as positioned "horizontally" under ground in a watering zone.
FIG. 6 is a side view of the moisture probe of FIG. 2 as positioned "vertically" above ground in a watering zone.

As shown in FIG. 5 and 6, the irrigation systems 58 and 59 further includes the moisture probe 53, which is buried either underground, horizontally, or injected into the soil aboveground, vertically, in the watering zone and electronically connected to the control unit 22 as illustrated in FIG. 1. During operation, the moisture probe 53 detects the moisture level within the watering zone when the control unit supplies an electrical potential to the probes 53. In response to the electrical potential, the moisture probe 53 sends an electrical signal to the control unit 22 as illustrated in FIG. 1, in accordance with the amount of moisture in the soil adjacent the probe 53, as described in detail below. The control unit 22 described in FIG. 1 evaluates the electrical signal and enables or disables electrical power to the valve(s) 23 in FIG. 1, if the moisture level is below or above a predetermined threshold.

Figure 2:
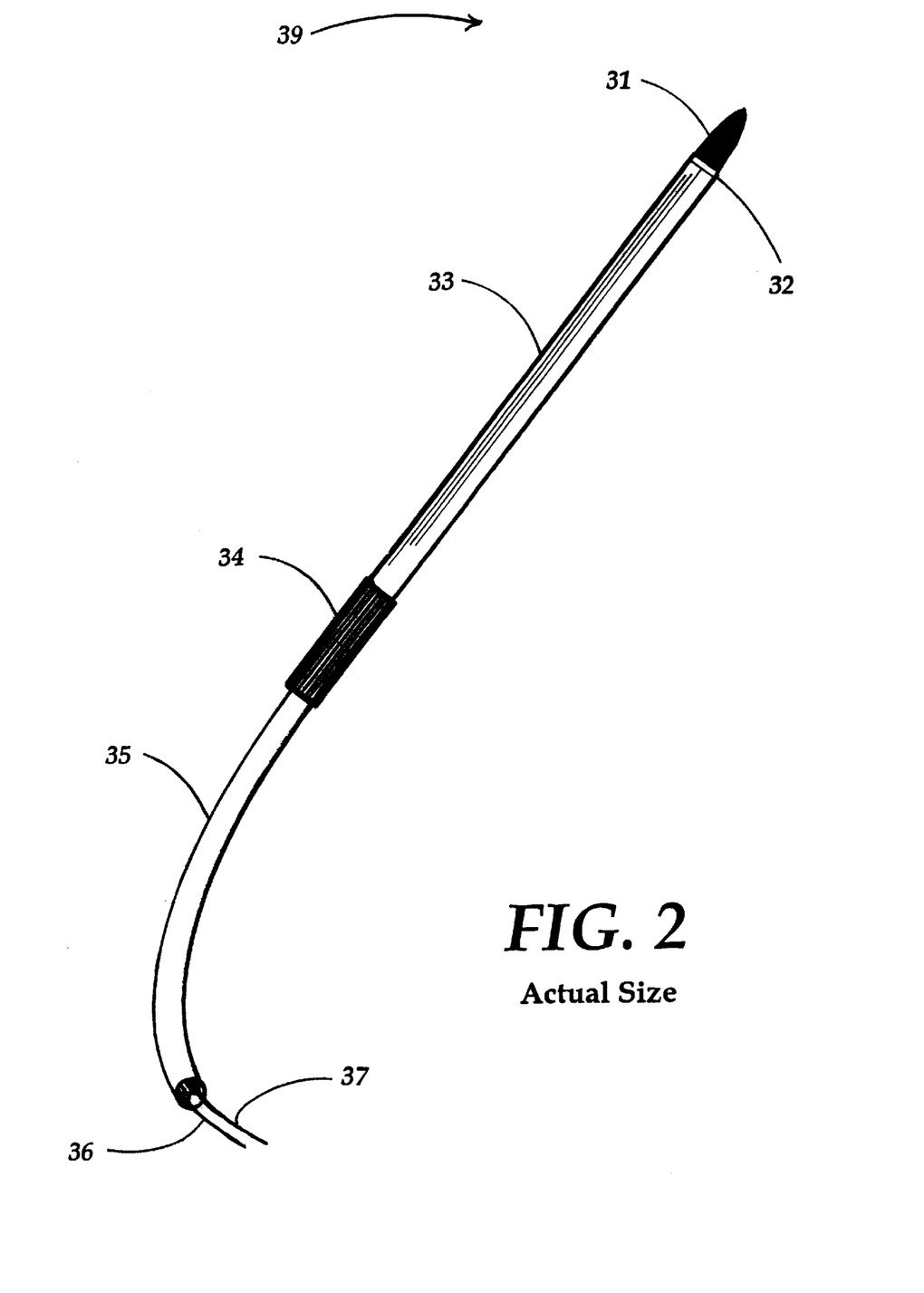
FIG. 2 is an actual size, (100%), top view of a first embodiment of a moisture probe that is used in the sprinkler systems of the present invention.

FIGS. 2 illustrate the actual size of a side view, respectively, of a first embodiment of the moisture probe system 29. It will be appreciated that, as used herein, the word "top" are with reference to the orientation depicted in enclosed drawings and are not intended to limit the scope of the invention. As shown in FIG. 2, the probe system 29 includes one dissembler metal probe tip 31, one dielectric insert 32, one stainless steel ¼' hollow metal shaft 33, and one shrink-type water sealant 34. Preferably, each probe assemblage is in a cylindrical shape.

Figure 3:
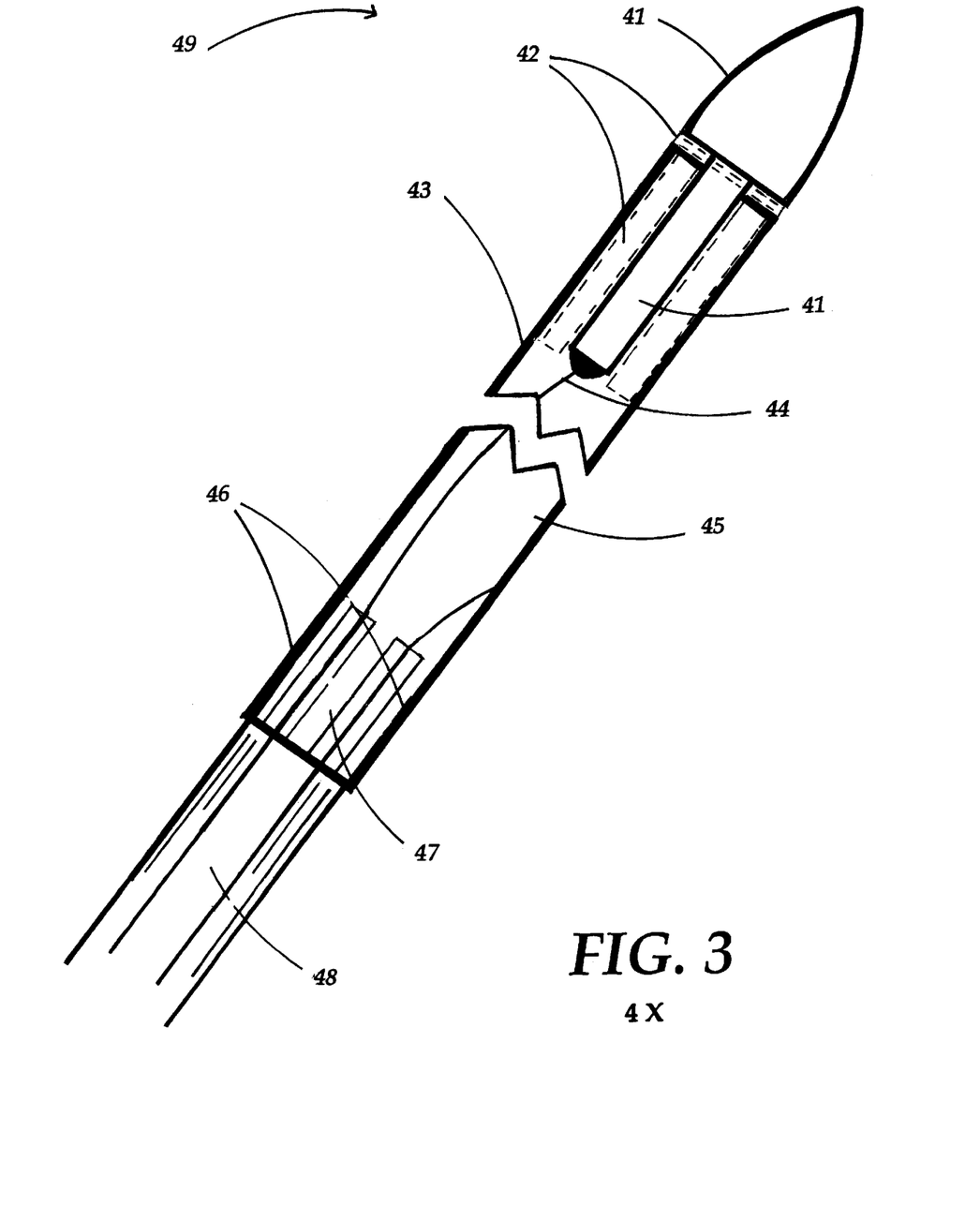
FIG. 3 is an exploded top view, (4 X), of the moisture probe illustrated in FIG. 2.

In FIG. 3, a full top segregated composite of a complete assembled system 49 views the width and length and thickness of the hollow shaft 43, the dielectric material 42 and metal probe tip 41 are substantially the same. As shown, the segregated view, exploded 4X that of the actual size of the "pencil" probe when oriented in a predetermined size relative to one another. Specifically, the internal shaft of the metal point 41 are aligned in a substantially internal parallel position with the dissembler metal shaft 41, and separated by the dielectric material 42.

In the embodiment illustrated in FIG. 3, a single dielectric, cylindrically-shaped spacer 42, is interposed between the metal probe tip 41 and the hollow metal shaft 43 to maintain the correct positioning relative to one another. An electrical shrink tape 47, is heated and shrank to securely fasten and strengthen the 18×2 underground cable.

Figure 4:
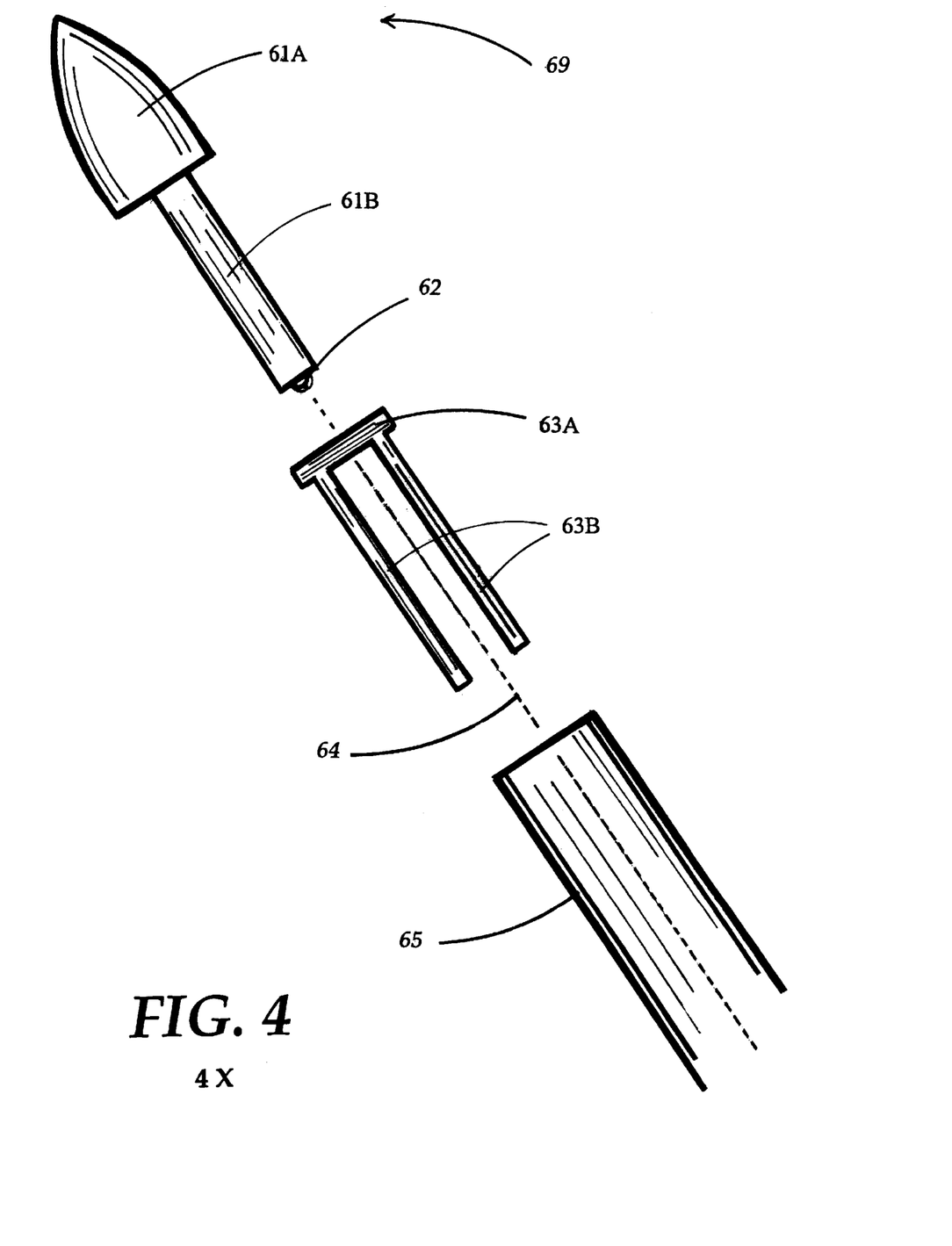
FIG. 4 is an exploded top view, (4 X), of the parts assemblage of the moisture probe illustrated in FIG. 3.

As shown in FIG. 4, and parts assemblage system 69, one electronically-conductive wire 64 are connected to the metal probe tip 61B. A second wire 45, as shown in FIGS. 3, is connected to the stainless steel tubing. Referring to FIG. 2, the wires 36 and 37 connect the moisture probe system 39, and communicate with the control unit 22 in FIG. 1. Preferably, as in FIG. 3, the wires 44 and 45 are injected into the hollow metal shaft 43, and sealed internally. Illustrated in FIGS. 4, using a single dielectric spacer 63A and 61B, it will be appreciated by those skilled in the art that any wide number of dielectric spacers having various sizes and shapes, may be used to maintain the distance and orientation between the hollow metal shaft 65 and the dissembler metal point 61A and 61B. Moreover, the single dielectric spacer is inserted at one end of the hollow metal shaft 65, and remains sealed within the scope of the present invention. The dielectric spacer 63A and 63B is relatively small in diameter so the space between the hollow metal shaft 65 and the metal probe point 61B remains unobstructed and relatively weather proof.

The underground wire 45, in FIG. 3, may be secured to the hollow metal shaft 43 and the second wire 45 may be secured to the metal probe point 41 in a wide variety of well know manners, such as by soldering, spot welding, screws, or other suitable electrical connections. The length of the underground cable wires 28A and 28B in FIG. 1, should be long enough to reach from the position of the control unit 22, to the location of the watering zone where the moisture probe system is located during use. In FIG. 3, the wires 44 and 45 are inserted through one end of the hollow metal shaft 43. In FIG. 2, the wires are preferably encased in an underground insulating material 33 to protect the wires from decay and to insulate them electrically from the surrounding environmental elements. The actual size of the underground cable 35, in FIG. 1, is sized so as when inserted into hollow shaft 33, it will add strength and allow sealant to the probe system 39.

In FIG. 4, spacer 63A and 63B are one in the same piece with a center hole for the metal probe tip to insert into. Both dielectric apertures will systematically fit into one end of the hollow metal tube and be sealed against both chemical and mechanical elements. Because the spacers are mounted to the end of the hollow tube and sealed, it will add stability and rigidity to the shape of the probe, and advantageously do not obstruct the probe when buried horizontally or vertically underground.

The preferred dimensions of the moisture probe system 39, FIG. 2, may vary as described below. The hollow metal tube 33 may range in length from 4½ inches to 6½ inches in length. Preferably, the overall length of the moisture probe including the metal probe tip 31 and 33 is about 5 inches long, which exhibits optimal water detecting characteristics. The preferred outer dimension (OD) of the hollow shaft tubing 33 is ¼ inch and may range upwards to ½ inch. The preferred gauge of the metal of the hollow shaft tubing 33 is 3/64 of an inch and will range up to 5/64 of an inch.

In FIG. 4, probe system 69, the dielectric spacer 63A will have a top circumference of ¼ inch, and a preferred thickness 3/32 of an inch. The insert portion of the spacer 63B will have a circumference of 7/64 inches, and a length of 1¼ inches. The dielectric spacer will be center drilled to conform with the probe metal tip 61B, with a circumference of 4/64 inches.

In FIG. 4, the preferred dimension of the metal tip 61A, is from zero to ¼ inch in width. The preferred circumference of the inserted portion of the metal tip shaft, 61B, is 3/64 inch of and inch, with a total length of one inch. The metal consistency of the metal tip shall be a mixture of high purity lead, 90 percent, and 10 percent non-corrosive conducive hardener.

FIG. 1 illustrates the control unit 22. The control unit includes a casing that is substantially square in shape and houses the electronic components. The electronic components will be encased in an electronic epoxy for weather and moisture proofing. The control unit 22 will include a rotary mounted knob 22A that connects to a shaft from the internal electronic equipment. This knob 22A rotates according to the normal longitudinal axis for adjusting the control unit 22. One set of electrical wires 28A and 28B extend outward from the first control unit 22, to the Valve 23. A second set of wires 27A and 27B extend outward from the first control unit 22, to the transformer 21. A third set of wires 28C and 28D extend outward from the first control unit 22, to the probe. And, a fourth set of wires, 20A and 20B extend outward from the control unit 22, to wires 27A and 27B of the second control unit in series.

Referring to FIG. 1, the knob 22A is used as an adjuster for adjusting the sensitivity of the moisture probe 24, to increase or decrease the moisture threshold at which the control unit enables or disable power to the irrigation system 29. Preferably, the operator will turn the knob 22A clockwise to increase the moisture threshold, and counter-clockwise to decrease the moisture threshold. Turning the knob 22A clockwise would increase the moisture content to the watering zone, and counter-clockwise would decrease the moisture content to the watering zone. It would be appreciated by those skilled in the art, that the present invention is not limited to using a rotatable knob as the sensitivity adjuster. Any wide variety of methods may be used to vary the sensitivity of the moisture probe 24.

FIG. 5 illustrates the preferred horizontal location and orientation of the moisture probe 53. The probe 53 is located at a depth suitable to detect the amount of moisture for the roots of the plants growing in the watering zone for which the moisture is controlled. The cable 54 is buried at a similar depth, or deeper to accommodate aeration equipment. In areas which are covered by grass 51, the moisture probe should be buried at the root level of three to four inches to control the vertical penetration of moisture in the soil 52.

When power is received from the timer, the control unit also applies an electricity to the impedance circuit formed by the electrode metals of the probe 53 through the underground cables. Advantageously, a 1.5 volt direct current is applied to one of the dissembler metals of the probe 53, so there is a 1.5 volt potential between the two dissembler metals. The electrical resistance of the soil 52 that is located along the length of the hollow metal shaft, and the metal point is a function of the level of moisture in the soil. If the soil 52 contains a high level of moisture, the resistance exhibited by the soil is lower than if the soil contains a low moisture level. Accordingly, a higher resistance in the moisture probe 52 corresponds to a low moisture content in the watering zone. A relatively low resistance corresponds to a high moisture content. The moisture probe 52 then sends an electrical signal, having a voltage proportional to the resistance of the soil, to the control unit.

In FIG. 1, the control unit 22 enables or disable power to the valves 23 based upon the resistance of the soil as detected by the moisture probe 24. As discussed, the voltage of the signal sent by the probe 24 is proportional to the resistance as detected by probe 24 in the soil. The control unit 22, using a potentiometer, compares the resistance of the soil to a predetermined resistance value, corresponding to the resistance at which soil moisture is sufficient for the particular watering zone. As discussed above, as reference to FIG. 1, an operator may manipulate the control unit 22 to adjust the predetermined resistance value. If the soil resistance is below the predetermined resistance value, then the moisture level is sufficiently high for the particular watering zone. The control unit 22 then disables electrical power from being routed to the solenoid valve 23. If the resistance measured by the moisture probe 24 rises above the predetermined value, the control unit 22 enable power to the valve 22 so that water is supplied to the irrigation sprinkler heads 25 and the zone is watered.

The irrigation system 29 therefore does not irrigate the watering zone when the moisture level within the watering zone is above a predetermined value. The moisture probe 24 advantageously assists a user in conserving water by disabling irrigation to the watering zone unless the watering zone actually requires water. The probe 24 having the dimensions described herein advantageously exhibits optimal moisture detecting characteristics in a wide variety of soils so the minimum maintenance of the irrigation system 29 is required by a user. If the watering zone is sloped, the probe or multiple probe locations should be increasingly towards the top as the elevations become steeper. Additionally, the probes should be placed in the portions of the zones that receive the most sunlight and the most wind velocity.

Figure 7:
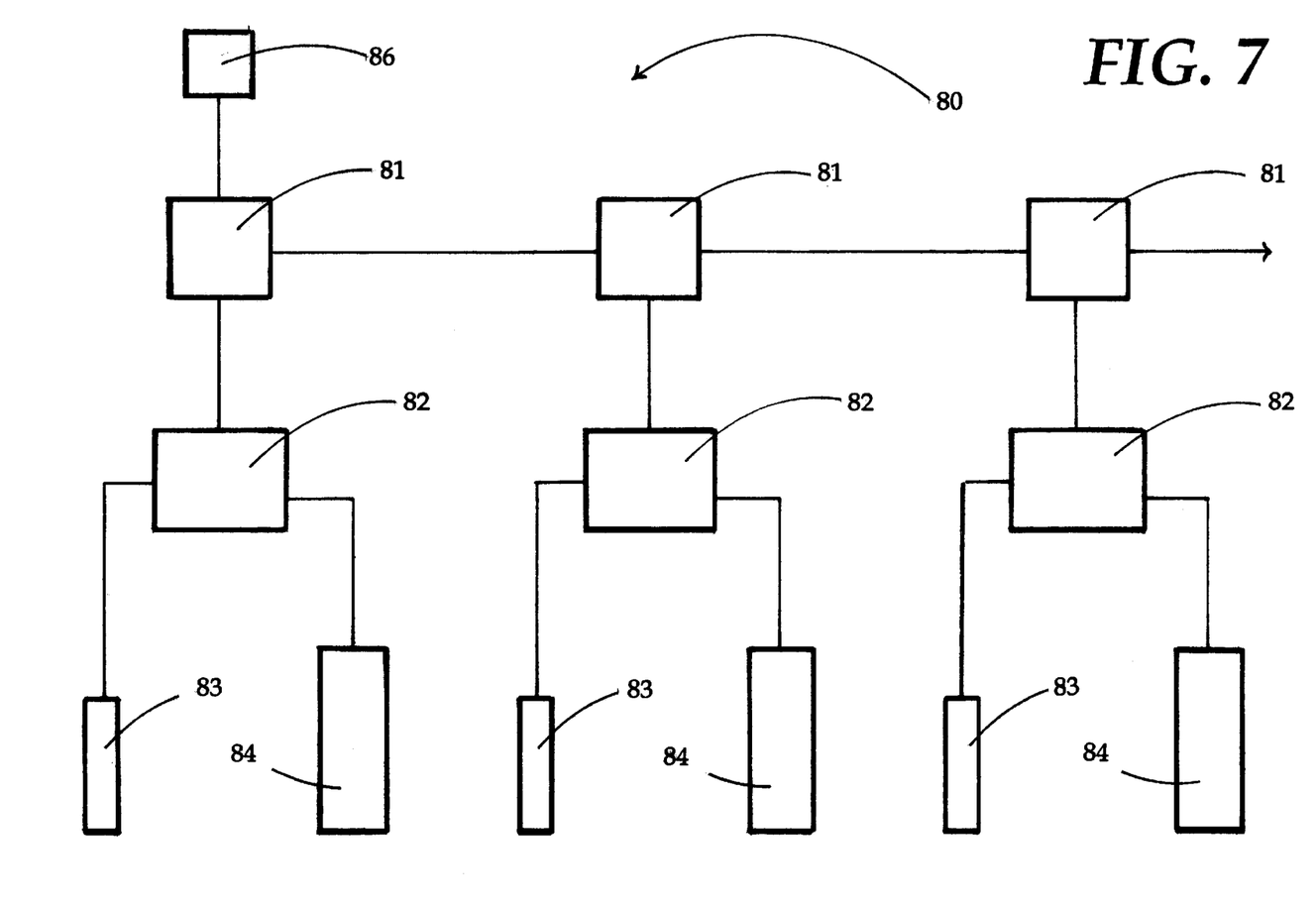
FIG. 7 is a schematic illustration of a sprinkler system having a series of moisture probes and control units.

As shown schematically in FIG. 7, the system 80 advantageously comprises a plurality of watering zones with one valve 82 and one sprinkler head 84 for each watering zone. Further, there is advantageously a control unit 81 for each valve 82, with the various control units 81 connected in series such that each valve 82 and its associated sprinkler head 84 operates sequentially. This may be achieved, for example, by connecting a plurality of control units 81 in series, with each control unit 81 having an open relay which is closed when the probe 83 associated with each control unit 81 indicates that the moisture level in the soil is adequate. Thus, a first control unit 81' associated with a first valve 82' and a first watering zone is connected in series with a second control unit 81' associated with a second valve 82' and a second watering zone. The first control unit 81 contains an open relay that interrupts power to the second control unit 81'. When the probe 83 associated with the first control unit 81 indicates that the watering zone has sufficient moisture, the relay is closed and power is supplied to the second control unit 81'. The second control unit 81' contains an open relay that interrupts power to a third control unit 81," until sufficient moisture is indicated by second probe 83' associated with second control unit 81'. This arrangement can be repeated as many times as desired, provided the wire connecting the control units 81 is adequately sized, and the transformer 86 is large enough to handle the voltage needs.

Although the above description of the present invention has disclosed the features of the invention as applied to the various embodiments, it will be understood that various omissions, substitutions, and changes in the form of the detail of the embodiments illustrated may be made by those skilled in the art without departing from the spirit of the present invention. Consequently, the scope of the invention should not be limited to the foregoing disclosure.

What is claimed is:

1. A removable soil moisture sensor system, configured to control the amount of soil moisture in a given area of turf or vegetative landscape, comprising:

a single moisture sensing probe comprised of a first electrode having an circular, tubular shape, said electrode having a length, an inner dimension of width, an outer dimension of width, and a wall thickness; a second electrode having a cone shaped dimension, with an outer dimension of width matching said first electrode, a shaft matching the inner dimension of the first dielectric, said second electrode being oriented and substantially aligned to first electrode, said second electrode being spaced apart from said first electrode by a dielectric, a predetermined distance for maintaining the orientation of said first electrode relative to said second electrode when the electrodes are embedded in the soil;

a source of electrical power connected to said first and second electrode for applying a first electrical potential to said first and second electrode;

a first control unit for measuring the electrical potential between said first and second electrode when said first and second electrodes are imbedded in the soil, said first control unit configured to disarm a flow of electrical current from said source of electrical power to a first water valve if said first electrical potential drops below a pre-established value.

2. The soil moisture sensing probe of claim 1, wherein said length of said first electrode is within a range of about 4 inches to 7 inches.

3. The soil moisture sensing probe of claim 2, wherein said length of said first electrode is about 4½ inches.

4. The soil moisture sensing probe of claim 1, wherein said outer dimension width of said first electrode is within a range of ¼ inch to ½ inch.

5. The soil moisture sensing probe of claim 4, where in said outer dimension of said first electrode is about ¼ inch.

6. The soil moisture sensing probe of claim 1, where in said inner dimension of said first electrode is within a range of 5/16 inch to ¼ inch.

7. The soil moisture sensing probe of claim 6, where in said inner dimension of said first electrode is about 7/16 inch.

8. The soil moisture sensing probe of claim 1, where in said gauge of tubing wall of said first electrode is within a range of 1/32 to 4/64 inch.

9. The soil moisture sensing probe of claim 8, where in said gauge of tubing wall of said first electrode is about 3/64 inch.

10. The soil moisture sensing probe of claim 1, where in said total length of said second electrode is within a range of 1 inch to 1¾ inches.

11. The soil moisture sensing probe of claim 10, where in said total length of said second electrode is about 1¼ inch.

12. The soil moisture sensing probe of claim 1, where in said cone length of said second electrode is with in a range of b ⅜ to ¾ inches.

13. The soil moisture sensing probe of claim 12, where in said cone length of said second electrode is about ½ inch.

14. The soil moisture sensing probe of claim 1, where in said shaft length of second electrode is within a range of about 1 inch to 2 inches.

15. The soil moisture sensing probe of claim 14, wherein said shaft length of second electrode is about 1¼ inches.

16. The soil moisture sensing probe of claim 1, wherein said top portion of dielectric spacer of soil moisture sensing probe is within a circumference range of ⅛ inch to ⅜ inch.

17. The soil moisture sensing probe of claim 16, herein said top portion of dielectric spacer of soil moisture sensing probe is about ¼ inch circumference.

18. The soil moisture sensing probe of claim 1, herein said top portion thickness of dielectric spacer of soil moisture sensing probe is within a range of about 1/16 inch to ¼ inch.

19. The soil moisture sensing probe of claim 18, herein said top portion thickness of dielectric spacer of soil moisture sensing probe is about 3/32 inch.

20. The soil moisture sensing probe of claim 1, herein said bottom portion thickness of dielectric spacer of soil moisture sensing probe is within a range of about 3/32 inch to 5/32 inch.

21. The soil moisture sensing probe of claim 20, herein said bottom portion thickness of dielectric spacer of soil moisture sensing probe is about 7/64 inch.

22. The soil moisture sensing probe of claim 1, herein said bottom portion length of dielectric spacer of soil moisture sensing probe is within a range of about to 1 1/12 inches.

23. The soil moisture sensing probe of claim 22, herein said bottom portion length of dielectric spacer of soil moisture sensing probe is about 1¼ inch.

24. The soil moisture probe of claim 1, wherein said spacer is of dielectric material permanently interjected inside shaft of the first electrode.

25. The soil moisture probe of claim 16, wherein said spacer is drilled through the length of the dielectric material to accommodate an electric wire.

26. A watering system for watering as series of soil watering zones comprising:

a 24 VAC power supply for supplying power along a power path;

a first soil probe system located along said power path and including a first water valve connected to a first sprinkler, a first soil moisture probe configured to measure the moisture level in a first soil watering zone, and a first control unit communicating with said first moisture probe and said first water valve, said first control unit configured to close the first water valve if said water moisture level is below a predetermined level;

a second soil probe system located along said power path, said second soil probe system including a second water valve connected to a second sprinkler, a second moisture probe configured to measure the moisture level in a second soil watering zone, and a second control unit configured to close the second water valve in the moisture level in the second soil watering zone is below said predetermined level;

a relay located in said power path between said power supply and said second soil probe system, said relay controlled by said first control system to allow power to flow across said relay to said second soil probe system when the moisture level in the first watering zone is greater than or equal to said predetermined level, and to inhibit power from passing across said relay when the moisture level in the first zone watering is less than the predetermined level; wherein the first and second moisture probes each comprise a first electrode having a circular tubular shape, having a length, width and thickness, a second electrode having a length, width and thickness, being spaced apart from said first electrode by a predetermined distance, and spacers permanently connected to first electrode for maintaining the distance between said first and second electrodes.

27. The soil moisture probe of claim 10, the second electrode is constructed of a material consisting of about 90% lead, and 10% metal hardeners.

* * * * *